Jan. 5, 1943.  L. G. COPEMAN  2,307,020
METHOD OF DISPENSING AND USING RUBBER
Filed March 30, 1937
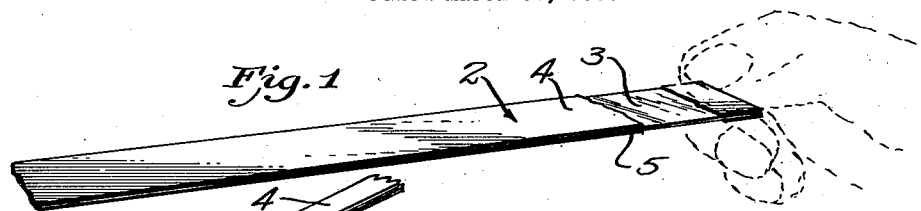
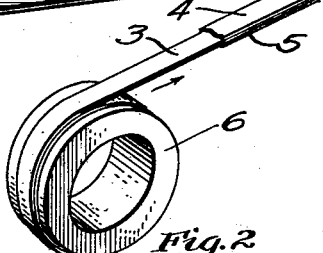
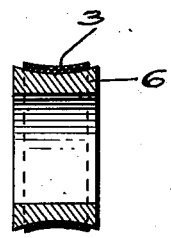
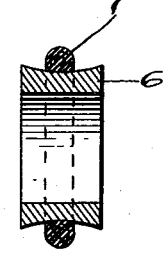
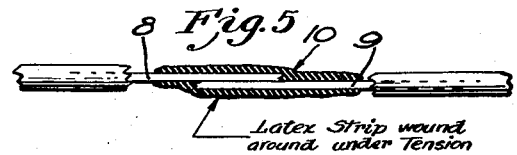
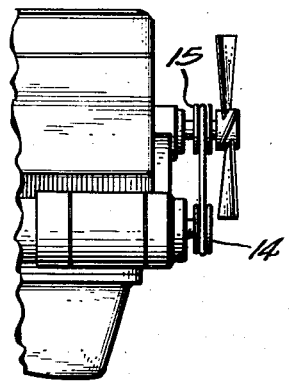
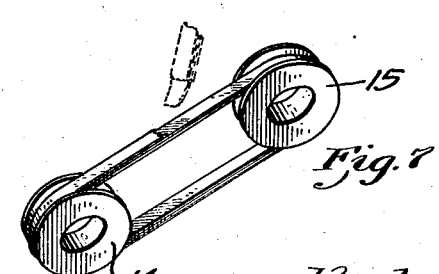
INVENTOR.
Lloyd G. Copeman
BY
Barnes, Kisselle, Laughlin & Raisch
ATTORNEYS Patented Jan. 5, 1943

2,307,020

UNITED STATES PATENT OFFICE 2,307,020

METHOD OF DISPENSING AND USING RUBBER

Lloyd G. Copeman, Flint, Mich., assignor to Copeman Laboratories Company, Flint, Mich., a corporation of Michigan Application March 30, 1937, Serial No. 133,794

8 Claims. (Cl. 154—2)

This invention relates to a method of dispensing and using rubber, and has to do particularly with a method of obtaining beneficial results from the tension, cohesion, and contraction properties of a sheet of rubber dispensed from an aqueous dispersion of rubber. This application is a continuation in part of my Patent No. 2,075,178, issued March 30, 1937.

In carrying out the method steps of the present invention, use is made of a flat sheet of rubber deposited from an aqueous dispersion of rubber. In the preferred form of carrying out the invention, the flat sheet of deposited rubber is positioned between two strips of paper or the like, the aqueous dispersion of rubber serving to bond the two sheets of paper together, but such sheet of rubber being removable by placing pressure upon the sheet of rubber and moving transversely; in this way the sheet of rubber will be dispensed because the inherent toughness of the deposited rubber is much greater than the bonding action between the sheets of rubber and the sheets of paper.

An important feature of the present invention has to do with the manner of applying and controlling the application of the thin sheet of uncured rubber whereby to obtain a beneficial result from the tension, cohesive and contractive properties of the rubber as it is dispensed.

In the drawing:

Fig. 1 is a perspective view of a length of packaged uncured rubber in sheet form, one end of the dispensing unit being torn to illustrate the manner of starting and dispensing the sheet of rubber.

Fig. 2 illustrates the step of dispensing and wrapping the sheet of rubber around a wheel or the like.

Fig. 3 is a sectional view of the wrapped wheel showing the overlapping layers of uncured rubber.

Fig. 4 illustrates a manner of rolling up the superimposed sheets of rubber so that they adhere together as a cohesive, homogeneous mass.

Fig. 5 illustrates a method of splicing wires according to the present process.

Fig. 6 illustrates a further method of applying and obtaining the tension, cohesive and contractive properties of the rubber as a clamping means.

Figs. 7 and 8 illustrate the manner of using the uncured strip of rubber as an emergency belt, the superimposed layers of sheet rubber cohering together and contracting to place the connected parts under tension.

As a medium in carrying out the steps of the present invention, I prefer to utilize rubber deposited from an aqueous dispersion of rubber in a thin delicate membrane positioned between one or more supporting and protective pieces of paper; it will be understood that the paper itself has no particular function in the present invention other than it serves as a convenient medium for not only temporarily retaining the membrane but for dispensing and releasing the same, as will be subsequently described.

One manner of forming a dispensing unit for the strip of rubber is illustrated and described in said Patent No. 2,075,178, wherein the formation of the laminated paper will be continuous. Another method would be to spray the surfaces of two continuously moving sheets of paper, the spray preferably being in the form of a combined spray of latex and coagulant as will be well understood by those skilled in the art, so that the sheet of rubber sets up fairly rapidly on the respective surfaces of the sheets of paper; the sprayed sides of the two continuously moving sheets of paper may then be joined together so that the two layers of latex cohere together and become one homogeneous mass. The resulting product is illustrated as at 2 in Fig. 1, where the sheet of rubber is shown as at 3 and the top layer of paper at 4 and the bottom layer as at 5. Whether or not vulcanizing ingredients are added to the aqueous dispersion of rubber when the laminated sheets of paper are first formed, the important feature, as far as this case is concerned, is that the sheet of deposited rubber is in such form that when the sheet is dispensed from the paper layers and wrapped upon itself the respective layers of rubber deposited from latex or other aqueous dispersion of rubber will stick to each other or, in other words, will cohere and form a homogeneous mass. In general, such rubber may be said to be uncured. Thus the paper not only serves to retain and properly dispense the sheet of rubber but protects the same so that the sheets of rubber may be properly used for many months after the formation of the dispensing unit.

The formed strips of paper 2 may be cut in any length or used in rolls of various lengths, and, if necessary, can be kept in that form for years at a time. When it is desired to use some of the sheet rubber, all that is necessary to do is to tear away one end of the strip, as shown at the right hand end of Fig. 1, and subsequent positive relative movement between the torn away portion and the main portion of the strip will cause the sheet of rubber 3 to be pulled away from between the two strips of paper. While the bonding action between the rubber and paper is sufficient to retain the shape of the strip, the tearing away action between the rubber and the sheets of paper is relatively easy.

I have discovered that if the sheet of deposited rubber is stretched and then wrapped or formed around an article, while in this stretched condition, that this wrapped form will tend to contract; for instance, if a laminated strip of paper like Fig. 1 is broken as shown, and then wrapped around a circular object, say fifteen inches in diameter and the wrapped around portion removed from the object, the resulting annular band formed by the layers of rubber will within a very short time contract to an annular band of approximately two inches or less in diameter. When the successive layers of rubber are wound while stretched on top of one another, the uncured layers of rubber will cohere with each other to form a homogeneous mass and when this mass is rolled so as to be substantially circular in cross section this contracting action seems to be accentuated.

Figs. 2 to 8 illustrate various methods of making use of the tension, cohesion and contraction of the sheet of uncured rubber. In Fig. 2 I have illustrated diagrammatically as at 6, a wheel member, such as a toy wheel used for children's vehicles. In this case one end of the strip of laminated paper may be broken and the sheet of rubber pulled away from the enclosing sheets of paper and wrapped around the central portion of the wheel 6. The sheet of rubber being held under tension during the wrapping process. The wrapped layers of rubber are shown in Fig. 3; and if such wrapped layers are rolled into circular form as shown at 7 in Fig. 4, such layers will cohere together and form a homogeneous mass, with the result that a rubber tire has been formed on the wheel 6; such homogeneous band of rubber will contract very tightly about the wheel 6 so as to be securely held in position, and the rubber tire thus formed will have excellent wearing properties.

It will thus be seen that the wrapped layers may not only be readily formed into a homogeneous mass of circular cross section but such homogeneous mass will be under constant contraction inasmuch as the layers of rubber will cohere together in their stretched form and it will be seen that this great contraction is due because of the tendency of the homogeneous mass to assume the position it had while in its original form in the dispensing unit.

In Fig. 5 I have illustrated another modified manner of carrying out the steps of the present invention in connection with the splicing of insulated wires and the like. In the embodiment two wires 8 and 9 are scraped in the usual manner to remove the insulation and the ends thereof are positioned in parallel overlapping relationship. Now, if a strip of laminated paper and rubber, as shown in Fig. 1, is broken, as also illustrated in Fig. 1, and the rubber membrane 3 stretched as it is wrapped around the overlapping wires 8 and 9, the result will be a homogeneous mass 10 of rubber formed by the cohesion of the superimposed strips of rubber to each other as the membrane is wrapped around the splice. The homogeneous mass of rubber will tend to contract so as to form a very tight grip around the overlapping wires, with the result that a spliced joint is obtained which will stand a relatively great amount of tension before breaking apart. Furthermore, the spliced joint is very neat and is of substantially the same diameter as the insulated cover for the wire.

In Fig. 6 I have illustrated another manner of carrying out the steps of the present invention wherein a frame member 11 having mitered joints 12 is diagrammatically illustrated; it will be understood here that any type of furniture or the like having joints to be glued may take the place of the member illustrated at 11. In this case the length 2 is broken apart as shown in Fig. 1 and the membrane of rubber wrapped around the frame or article while stretched or under tension. The superimposed membranes may be in the flat as illustrated at 13 or may be rolled up similar to the roll shown in Fig. 4. The superimposed layers of rubber will cohere to one another while in their stretched position and then the cohered layers of rubber will tend to assume their original position, thus placing the frame 11 or similar article under considerable contraction.

In Figs. 8 and 9 I have illustrated another method of carrying out the invention wherein the membrane of uncured rubber may be used as an emergency belt. In the drawing, pulleys 14, 15 represent driven and driving pulleys respectively, such as may be used to connect the fan shaft with the generator shaft or vice versa. In this case if the regular pulley breaks one need only take two or three short strips or one long strip of laminated paper and rubber, such as shown in Fig. 1, and then wrap the membrane of rubber around the two pulleys, the superimposed layers of rubber cohere to each other to form a belt which will be very tight due to the contractive powers of the layers of rubber and which will function for a relatively long period of time, depending upon the extent of disintegration of the rubber by oil and grease.

It will thus be seen that tension of the membrane of rubber while being applied, cohesion between the superimposed layers during and after application, and the tendency of the cohered layers of rubber to contract are important features in carrying out the present process.

What I claim is:

1. The method of dispensing and using a flat sheet of rubber deposited from an aqueous dispersion of rubber as a thin film upon a sheet of fibrous material such as paper, which comprises tearing the paper, stretching the rubber to gradually remove the rubber from one part of the torn paper and wrapping the stretched rubber, as it is gradually removed, around an article, the stretched rubber being in such condition that overlapping layers will cohere to one another when in contact, wrapping said stretched rubber in such a manner that certain portions of the sheet of rubber will be superimposed upon other portions, said superimposed layers of rubber cohering while in stretched form to form a homogeneous length of rubber tending to contract.

2. The method of dispensing and using a flat sheet of rubber deposited from an aqueous dispersion of rubber containing accelerators as a thin film upon a sheet of fibrous material such as paper, which comprises tearing the paper, stretching the rubber to gradually remove the rubber from one part of the torn paper and wrapping the stretched rubber, as it is gradually removed, around an article, the stretched rubber being in such condition that overlapping layers will cohere to one another when in contact, wrapping said stretched rubber in such a manner that certain portions of the sheet of rubber are superimposed upon other portions, said superimposed layers of rubber cohering while in stretched form to form a homogeneous length of rubber tending to contract.

3. The method of dispensing and using a flat sheet of rubber deposited from an aqueous dispersion of rubber as a thin film upon a sheet of fibrous material such as paper, which comprises tearing the paper, stretching the rubber to gradually remove the rubber from one part of the torn paper and wrapping the stretched rubber, as it is gradually removed, around an article, the stretched rubber being in substantially uncured condition so that overlapping layers will cohere to one another when in contact, wrapping said stretched rubber in such a manner that certain portions of the sheet of rubber are superimposed upon other portions, said superimposed layers of rubber cohering while in stretched form to form a homogeneous length of rubber tending to contract.

4. The method of dispensing and using a flat sheet of rubber deposited from an aqueous dispersion of rubber as a thin film upon a sheet of fibrous material such as paper, which comprises tearing the paper, stretching the rubber to gradually remove the rubber from one part of the torn paper and wrapping the stretched rubber, as it is gradually removed, around an article, the stretched rubber being in such condition that overlapping layers will cohere to one another when in contact, wrapping said stretched rubber in such a manner that certain portions of the sheet of rubber are superimposed upon other portions, and rolling said superimposed layers transversely to the direction of stretching from the paper to form an annular homogeneous article tending to contract.

5. The method of dispensing and using a flat sheet of rubber deposited from an aqueous dispersion of rubber containing accelerators, which comprises stretching the rubber and wrapping the stretched rubber around an article, the stretched rubber being in substantially uncured condition so that overlapping layers will cohere to one another when in contact, wrapping said stretched rubber in such a manner that certain portions of the sheet of rubber are superimposed upon other portions, and rolling said superimposed layers transversely of the edges of the superimposed layers to form an annular homogeneous article tending to contract.

6. The method of forming an annular article of rubber tending to contract, which comprises positioning a relatively thin layer of substantially uncured rubber between and bonding the same to two layers of paper, removing the layer of rubber from between the sheets of paper while stretching the same to destroy the bond between the rubber and the paper, and then wrapping the sheet of rubber while being removed from the paper around an article to obtain a plurality of layers of rubber superimposed upon one another while in stretched condition, the superimposed layers of rubebr cohering to one another while in such stretched condition whereby the cohered homogeneous mass will tend to contract.

7. The method of securing a plurality of articles together under pressure, which comprises depositing an aqueous dispersion of rubber as a thin film of substantially uncured rubber upon a strip of paper, pulling one end of the thin film of rubber away from the paper and surrounding said articles with a plurality of superimposed layers of said substantially uncured rubber in stretched condition.

8. The method of securing a plurality of articles together under pressure, which comprises depositing an aqueous dispersion of rubber as a thin film of substantially uncured rubber upon a strip of paper, pulling one end of the thin film of rubber away from the paper and using said paper as a stretching medium to surround said articles with a plurality of superimposed layers of said substantially uncured rubber in stretched condition, the stretched superimposed layers being formed into a single homogeneous mass.

LLOYD G. COPEMAN.